United States Patent [19]

Blanchard

[11] Patent Number: 5,615,922
[45] Date of Patent: Apr. 1, 1997

[54] VEHICLE WITH SIDE ACCESSIBLE CARGO BED AND STORAGE COMPARTMENTS

[75] Inventor: Raymond W. Blanchard, White Lake, Mich.

[73] Assignee: Roamer Corporation, Auburn Hills, Mich.

[21] Appl. No.: 624,177

[22] Filed: Mar. 29, 1996

[51] Int. Cl.⁶ ........................................... B60R 11/06
[52] U.S. Cl. ................... 296/37.6; 224/404; 224/539
[58] Field of Search .................. 296/37.6, 37.1; 224/402, 403, 404, 539, 542, 543, 544

[56] References Cited

U.S. PATENT DOCUMENTS

| | | | |
|---|---|---|---|
| 2,722,352 | 11/1955 | Dehnel | 296/37.6 X |
| 3,068,038 | 12/1962 | Douglass, Jr. | 224/404 X |
| 3,245,713 | 4/1966 | Ogilvie | 296/37.6 X |
| 3,722,946 | 3/1973 | Cary | 224/543 X |
| 4,685,695 | 8/1987 | LeVee | 280/423 B |
| 4,789,195 | 12/1988 | Fletcher | 296/37.6 |
| 4,917,430 | 4/1990 | Lawrence | 296/376 |
| 5,102,180 | 4/1992 | Finley | 296/37.6 |
| 5,169,200 | 12/1992 | Pugh | 296/37.6 |
| 5,188,414 | 2/1993 | Burnham et al. | 296/37.6 |
| 5,303,969 | 4/1994 | Simnacher | 296/37.6 |
| 5,316,358 | 5/1994 | Payne et al. | 296/37.6 |
| 5,368,357 | 11/1994 | Kalis, Jr. et al. | 296/37.6 X |
| 5,464,264 | 11/1995 | Wilson | 296/37.6 |

Primary Examiner—Joseph D. Pape
Attorney, Agent, or Firm—Young & Basile, P.C.

[57] ABSTRACT

A vehicle, such as a pick-up truck, having a cargo bed is provided with one or more openings which pass through side walls of the bed to provide access to the interior of the bed without the need to reach over the top edge of the side walls. Frames are disposed within the openings to line the peripheries thereof, the frames extending between inner and outer panels which make up the side walls. A hinged door is fitted to each opening to close of the opening when desired. Compartment covers may be installed inside of the bed to form storage compartments accessible through the openings. The storage compartments do not interfere with fitting of a cover or cap over the top of the bed, and are located so as to be compatible with other vehicle usages such as carriage of a bed-mounted camper unit or towing of a fifth-wheel trailer.

15 Claims, 2 Drawing Sheets

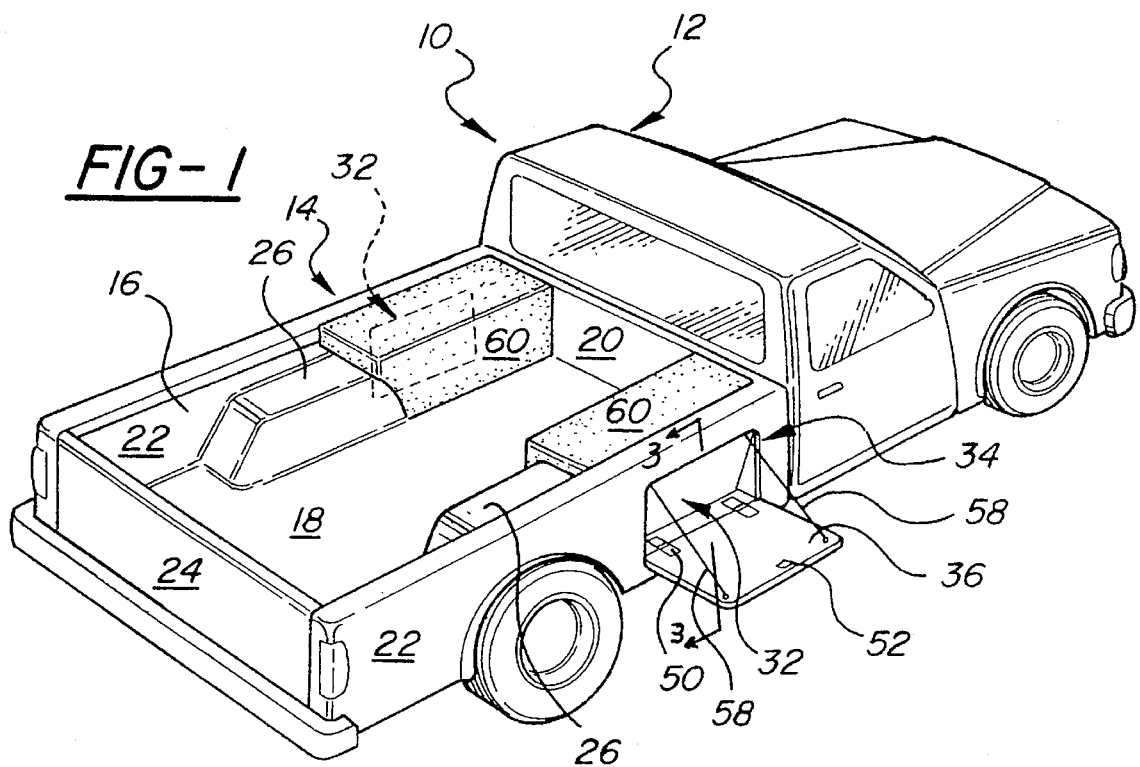
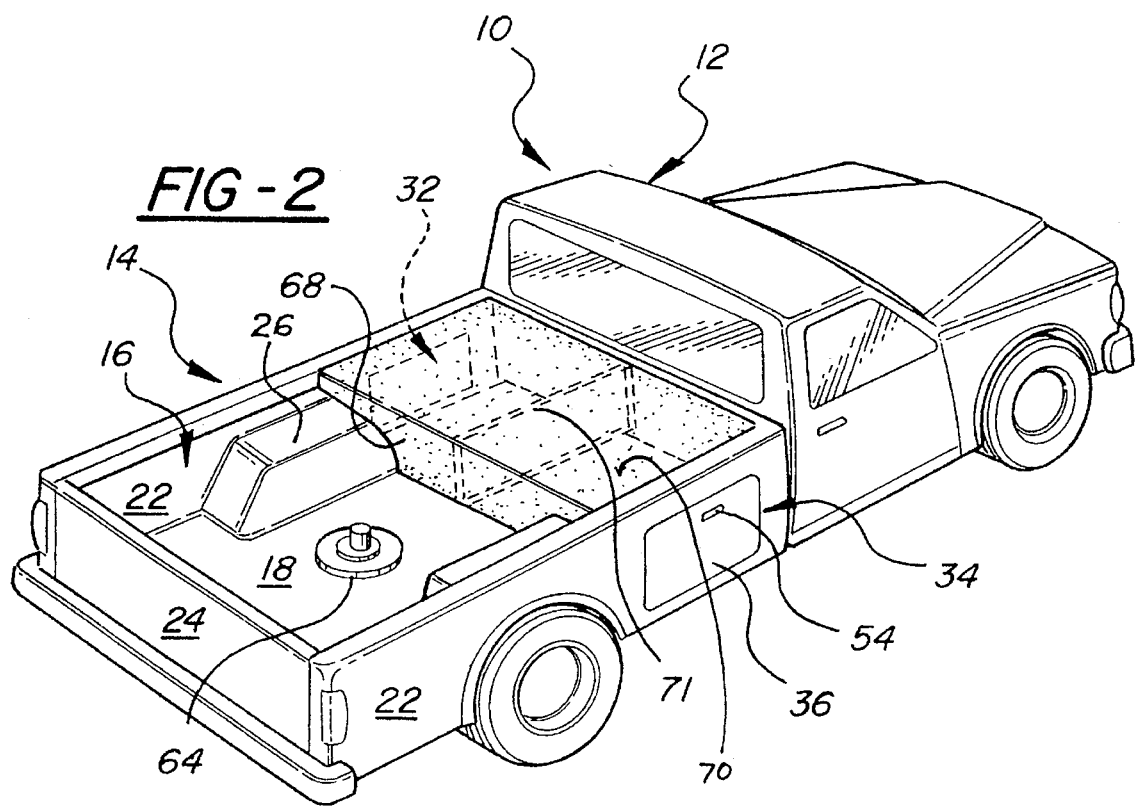

VEHICLE WITH SIDE ACCESSIBLE CARGO BED AND STORAGE COMPARTMENTS

FIELD OF THE INVENTION

The invention relates to vehicles, such as pick-up trucks, having cargo beds, and more specifically to a vehicle having openings in a sidewall of the cargo bed to provide access to a storage compartment therein.

BACKGROUND OF THE INVENTION

Objects may be placed into or removed from the cargo bed of a vehicle such as a pick-up truck or an open-topped trailer either by lowering a tail gate at the rear of the bed or by reaching over the upper edge of the side walls of the bed. Both of these options are somewhat inconvenient and/or awkward in certain circumstances. Since objects carried loosely in the bed tend to migrate toward the front of the bed when the truck is driven, they often can not be reached by a person standing on the ground behind an open tail gate. Accordingly, the objects may only be reached by climbing up into the bed or by reaching over the side walls. Attempting to lift items into or out of the bed over the side walls is difficult for all but the tallest of persons, and has the potential to cause injury to the back or other parts of the body.

Many owners/operators of pick-up trucks fit the cargo bed with a cover or a cap to protect the load from inclement weather and/or theft, thus making the bed even less accessible. The term "cover," as used herein, refers to a sheet of flexible material such as canvas that is pulled taught over the top of the cargo bed. Covers are Typically attached to the bed by snap fasteners, or by tie-down straps or ropes. The term "cap", on the other hand, refers to a rigid structure having sides and a roof and that extends above the walls of the bed. A cap is typically clamped or bolted to the bed walls on which it rests. With either a cover or a cap in place on the truck bed, the tail gate provides the only access to the bed, unless the cover is partially removed or the cap has openable side windows.

Rather than using a cap or cover to enclose the entire cargo bed, some pick-up owners/operators prefer an enclosed storage compartment that is mounted in a portion of the bed, leaving the rest of the bed open. Various designs of bed-carried storage units have been proposed and sold commercially, most being configured to contain and protect small objects such as tools.

One general type of storage unit is mounted at the extreme forward end of the cargo bed and spans the full width of the bed. Doors are typically provided on the top of the unit and open upwardly. These units usually have portions that extends outwardly over the side walls of the bed to engage stake pockets formed in the side walls, and accordingly they prevent simultaneous use of any cover or cap that extends over the full length of the bed. The doors can usually be lifted open by a person standing alongside the vehicle, but access to the interior of the compartment still requires either an awkward reach over the bed side walls or climbing into the bed. Front-mounted storage units also have the drawback of significantly decreasing the usable length of the bed, thus limiting the size of objects that may be carried.

Another type of storage unit is adapted to be positioned at the extreme rear of the bed, adjacent the tail gate, with doors and/or drawers that are openable once the tail gate is lowered. Although such units provide storage that is relatively easily reached when standing behind the truck, they also of necessity obstruct access to the bed forward of the storage unit. These units are similar to the front-mounted units described above in that they often include some structure extending over the top of the sidewalls to hold them in place, and thus are incompatible with bed caps and covers.

Pick-up trucks are also sometimes used to carry bed-mounted camper units. Since a standard camper unit occupies substantially the entire cargo bed, any of the bed-mounted storage units existing in the prior art must be removed before a camper may be mounted. The only spaces within the bed that are of a practically usable size when a camper unit is mounted are the two volumes directly forward of the wheel well housings on either side of the bed. These spaces are left empty because a camper unit is designed to slide horizontally into the mounted position from the rear of the bed, so that the lowermost 18 to 24 inches of the front end of the camper can be no wider than the distance between the wheel well housings. These two volumes are completely boxed-in by the camper unit and the bed side walls and so can not be accessed from the outside of the truck.

Pick-up trucks are also sometimes used to tow so-called "fifth-wheel" trailers. For this task, the truck is fitted with a large towing hitch on the floor of the bed above the truck's rear axle. While there is room in the bed forward of the hitch to install a storage unit if desired, the fifth-wheel trailer extends forwardly of the hitch to overhang any storage unit located there and obstruct opening of the unit's doors.

SUMMARY OF THE INVENTION

An objective of the present invention is to provide a vehicle having a cargo bed that may be conveniently accessed from alongside the exterior of the vehicle. In general, this is achieved by the provision of one or more openings passing through a side wall of the bed. The openings allow a person located outside the bed to access the cargo carrying space adjacent the forward end of the bed without the need to reach over the side walls or climb up into the bed, and also provides access when the bed is fitted with a cap or cover.

A further objective of the invention is to provide a vehicle having storage compartments disposed in the cargo bed that are easily accessed from the exterior of the vehicle and that do not unduly interfere with the load carrying volume of the cargo carrying space. In general, this is accomplished by locating the openings near the forward end of the bed and providing box-like enclosures within the cargo carrying space adjacent to and accessible via the openings.

According to a feature of the invention, a sleeve is provided which surround the periphery of the opening and extends between interior and exterior panels which form the side wall. The sleeve prevents objects stored in the bed from migrating into the space between the panels, stiffens the side wall in the area of the opening, and provides a "finished" appearance to the opening. A hinged door is fitted to the opening and may be locked in a closed position, thereby preventing unauthorized access to the cargo carrying space if the vehicle bed is enclosed by a bed cap or cover extending over the top of the cargo carrying space.

According to another feature of the invention, the vehicle further comprises wheel well housings projecting into the cargo carrying space on either side of the bed at a distance rearward from the front wall, and the opening is located between the front wall and the adjacent wheel well housing. This placement of the opening provides access to space that would otherwise be unreachable when a camper unit or other similar load is carried in the bed.

According to still another feature of the invention, the vehicle further comprises a box-like structure defining an enclosure located within the bed adjacent to the opening and accessible therethrough. The enclosure provides a relatively secure and weather-tight storage compartment within the cargo carrying space for the carriage of smaller objects, and is easily accessed by a person standing on the ground alongside the vehicle. The storage compartment is preferably located and configured so as to be compatible with a particular usage of the vehicle, leaving unobstructed the part of the bed that is needed for the particular usage while utilizing space within the bed that would not otherwise be used.

In an illustrative embodiment of the invention described herein, an opening is provided in each of the vehicle's side walls forward of the wheel well housings, and each opening is boxed in by a separate enclosure structure. Each enclosure structure extends from the front wall of the bed rearwardly to meet and extend partly over its respective wheel well housing, and projects no further into the cargo carrying space than the innermost extent of the wheel well housing. The resulting storage compartments effectively utilize the space ahead of the wheel well housings yet do so without decreasing the usable length of the cargo bed or preventing the mounting of most types of cover, cap or camper on the bed. This "saddle bag" configuration of storage compartments is particularly well suited for use with a pick-up truck carrying a camper, as it utilizes space that is otherwise unused when the camper is mounted on the bed and provides storage space that is accessible from outside of the camper.

In another illustrative embodiment of the invention described herein, the vehicle again has an opening on each side of the bed, but a single enclosure structure extends across the full width of the bed and is accessible via either of the two openings. This type of storage compartment is particularly well suited for use with a pick-up truck towing a fifth-wheel trailer, since the compartment is located forward of the trailer hitch in the truck bed. With the overhanging portion of a trailer substantially obstructing access to the forward part of the bed from above, the side access provided by the openings makes that portion of the bed much more easy to reach and effectively utilize.

The present invention also provides a kit comprising a plurality of components for installation in a vehicle of conventional, design to provide the vehicle with side accessible storage.

BRIEF DESCRIPTION OF THE DRAWINGS

FIG. 1 is a perspective view of a pick-up truck having side access openings according to the present invention and fitted with side-mounted compartment covers;

FIG. 2 is a perspective view of a pick-up truck having side access openings according to the present invention and fitted with a compartment cover extending across the full width of the bed;

DETAILED DESCRIPTION OF THE PREFERRED EMBODIMENT

Figure 3:
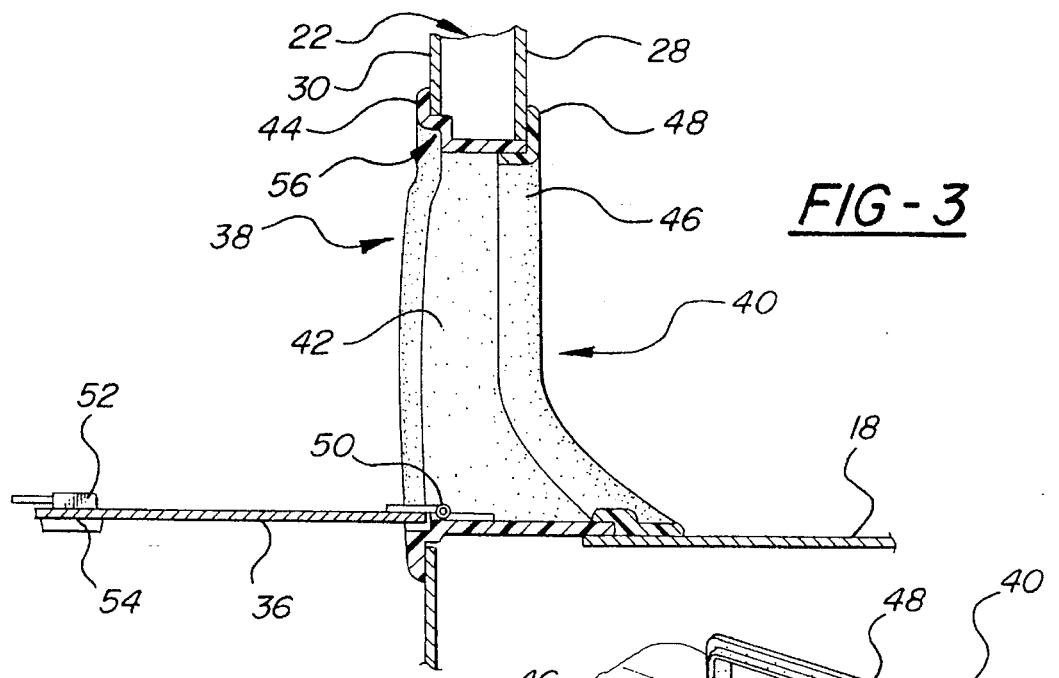
FIG. 3 is a cross section view along line 3—3 of FIG. 1.

FIGS. 1 and 2 both depict a pick-up truck 10 having the conventional overall layout of a forward cab 12 and a rear-mounted cargo bed 14 defining a cargo carrying space 16. Cargo bed 14 comprises a substantially flat, horizontal floor 18, a front wall 20 immediately adjacent to cab 12, a pair of side walls 22 extending rearwardly from the front wall, and a tail gate 24 of the drop-down type commonly fitted to pick-up trucks. Wheel well housings 26 are located on either side of the bed, projecting inwardly from side walls 22 and upwardly from floor 18. As may best be seen in FIG. 3, side walls 22 are of double-wall construction, comprising an inner panel 28 and an outer panel 30 spaced from one another in substantially parallel relationship.

Pick-up truck 10 has an opening 32 passing through each of side walls 22 to provide access to cargo carrying space 16 from outside of bed 14. Openings 32 are positioned forward of wheel well housings 26 and displace a large portion of the area of side walls 22 between their respective wheel wells and forward wall 20. Openings 32 are fitted with frames 34 and provided with doors 36 which hinge downwardly to an open position and may be latched in a closed position.

Figure 4:
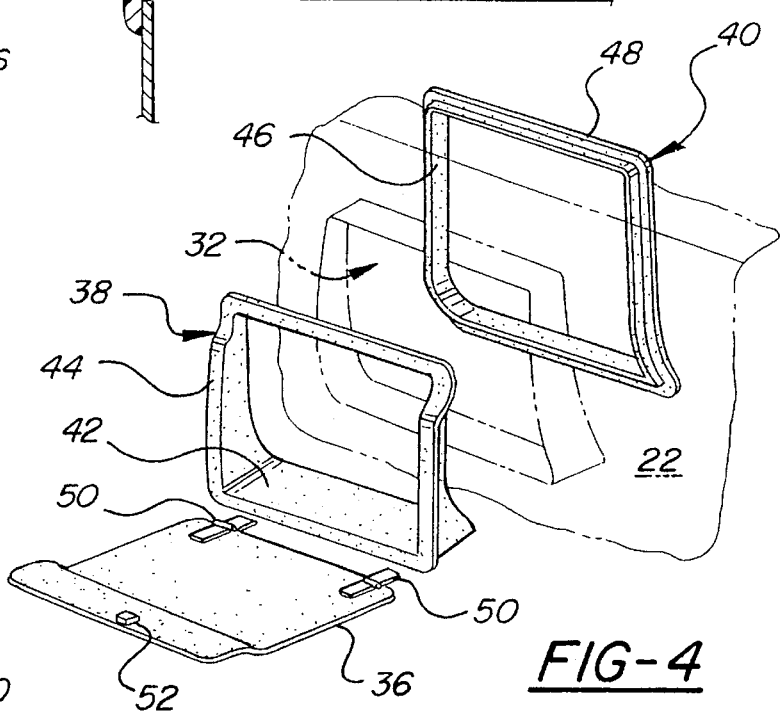
FIG. 4 is a perspective view of frame and door components as provided in a kit according to the invention.

As may best be seen in FIGS. 3 and 4, each frame comprises a sleeve 38 which is inserted through side wall 22 from the exterior of bed 14 and a clamp ring 40 which is inserted through the side wall from the interior of the bed. Sleeve 38 has a wall liner portion 42 that extends substantially perpendicularly between inner and outer panels 28, 30 and an outwardly turned flange 44 which flies flush against the surface of outer panel 30. Clamp ring 40 has a bonding ring 46 projecting into opening 32 to overlap the interior of wall liner 42, and has a flange 48 around its perimeter which lies flush with the surface of inner panel 28. Both sleeve 38 and clamp ring 40 are preferably molded of fiberglass or some other high strength plastic material and are bonded to one another where they overlap by an adhesive and/or by threaded fasteners. Flanges 44 and 48 are secured to outer panel 30 and inner panel 28 respectively, preferably by an adhesive to provide water-tight seals therearound.

Sleeve 38 and door 36 are shaped to match the contours of outer panel 30 and so provide a smooth, custom-fit appearance when mounted to pick-up truck 10. Besides providing an aesthetically pleasing appearance, matching the outer contours of side walls 22 minimizes the disruption of air flow over the surface of the truck when it is in motion, and so results in a minimal adverse effect on the truck's fuel efficiency.

Door 36 is attached at its lower edge to sleeve 38 by hinges 50 and has a latching mechanism 52 at its upper edge that is actuable by an externally mounted latch handle 54. When in the closed position, door 36 fits into a recess 56 formed in sleeve 38 adjacent its outer surface. As seen in FIG. 1, the upper edge of door 36 may be connected to sleeve 38 by cords 58 of the proper length to hold the door in a horizontal position when opened, so that it may be used as a table.

The lower edge of opening 32 is preferably positioned such that the lower surface of wall liner 42 is at approximately the same height as bed floor 18, overlapping it slightly, so that objects may be easily slid into and out of the bed. Because of this configuration, flange 48 does not extend across the bottom of clamp ring 40, but rather the lower surface of bonding ring 46 has a step to fit over wall liner 42 as shown in FIG. 3.

Figure 5:
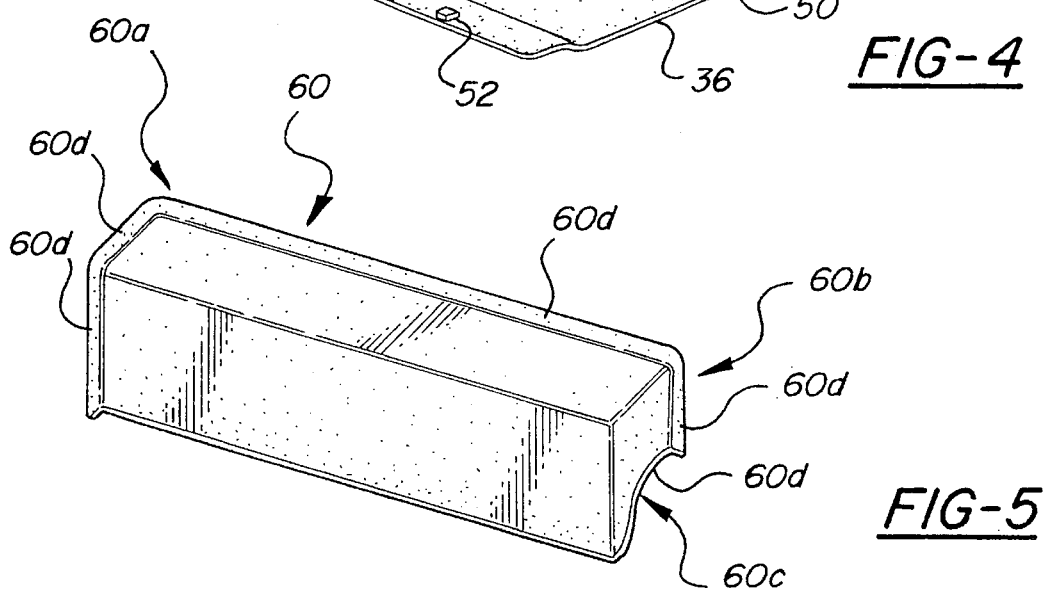
FIG. 5 is a detail of a compartment cover as seen in FIG. 1.

In FIG. 1, pick-up 10 is shown with a pair of compartment covers 60 mounted in bed 14 forward of wheel well housings 26 to enclose openings 32 and create a pair of side-located storage compartments. A compartment cover 60 is shown in detail in FIG. 5. Compartment covers 60 are preferably molded from fiberglass, and may be secured in place by adhesive and/or threaded fasteners. The forward end 60a of compartment cover 60 butts up against bed front wall 20, while the rear end 60b has a concavely curved edge 60c shaped to fit over wheel well housing 26. All of the edges of compartment cover 60 terminate in outwardly turned flanges 60d, the flanges providing surfaces for bonding to side wall 22, front wall 20, floor 18, and wheel well housing 26.

In the preferred embodiment of the invention, compartment covers 60 extend no further inward toward the center of bed 14 than do wheel well housings 26. In these positions, the compartment covers 60 do not interfere with the mounting of a standard pick-up camper unit (not shown) on the bed, and the full rectangular length and width of bed floor 18 as it exists between the wheel well housings 26 is preserved for the carriage of large objects.

The size, shape, location and number of openings 32 and compartment covers 60 may be varied as needed to provide a vehicle having side-accessible storage configured to be optimized for any particular vehicle use. For example, compartment covers 60 need not extend forward to meet the front wall 20 of bed 14 if it is desired to maintain an open, full-width portion of the bed immediately behind cab 12.

In FIG. 2, pick-up 10 is shown with a trailer hitch 64 mounted to bed floor 18, such as is used to tow a fifth-wheel trailer (not shown). A large compartment cover 68 is mounted in bed 14 forward of trailer hitch 64 and extends across the full width of the bed to enclose both openings 32 and create a large storage compartment. Large compartment cover 68 is formed of fiberglass as has flanged edges as do the smaller compartment covers 60 of the first embodiment described above, and is secured in place in a similar manner. A support frame 71 is provided in the interior of the storage compartment to strengthen compartment cover 68, and may be molded integrally with the cover or fabricated as a separate piece. The interior of the storage compartment may be subdivided into smaller sub-compartments if desired.

The storage compartment formed by large compartment cover 68 provides secure, weather-tight storage for relatively large objects, and is easily accessible through openings 32 even though a fifth wheel trailer may overhang the portion of bed 14 forward of wheel well housings 26 and so obstruct access to the bed from above.

The present invention may be practiced by modifying a conventional, commercially available pick-up truck that does not feature openings in the sidewalls. Such modification is facilitated by the provision of a kit comprising sleeves 38, clamp rings 40, doors 36, and compartment covers 60 or 68 as desired. Preferably, the kit also include templates (not shown) to be used as guides for cutting the openings in each of the side wall panels 28, 30. All of the above-listed kit components are designed to fit a specific make and model of truck, and may be supplied in a range of colors to match the paint color and trim package of the particular truck.

Whereas a preferred embodiment of the invention has been illustrated and described in detail, it will be apparent that various changes may be made in the disclosed embodiment without departing from the scope or spirit of the invention.

I claim:

1. A vehicle having a bed defining a cargo carrying space, the bed comprising a floor and first and second spaced, parallel side walls, each side wall comprising inner and outer spaced panels, the vehicle characterized in that the bed further comprises:

at least one opening passing through the inner and outer panels of at least one of the side walls;

frame means disposed within the opening adjacent the periphery thereof and extending between the inner and outer panels of the one side wall; and door means disposed adjacent the opening and movable between a closed position and an open position.

2. A vehicle according to claim 1 wherein the door means is secured to the frame means.

3. A vehicle according to claim 1 wherein the frame means comprises:

a sleeve having a flange overlapping the outer panel and secured thereto around the perimeter of the opening, and a wall liner extending from the flange into the opening substantially perpendicularly between the outer and inner panels; and a clamp ring having a second flange overlapping the inner panel and secured thereto around the perimeter of the opening, and a bonding ring extending from the second flange into the opening and into contact with the wall liner, the bonding ring and the wall liner being secured together.

4. A vehicle according to claim 1 further comprising enclosure means disposed in the cargo carrying space of the bed abuttingly adjacent the inner panel of the one side wall to form a storage compartment within the cargo carrying space, the storage compartment communicating with the opening, whereby the interior of the storage compartment is accessible through the opening.

5. A vehicle according to claim 1 wherein the bed has front and rear ends and a longitudinal centerline and further comprises first and second wheel well housings projecting upwardly from the floor and inwardly toward the centerline from the first and second side walls respectively at a distance rearward from the front end, and the opening is located between the front end of the bed and the wheel well housing adjacent the one side wall.

6. A vehicle according to claim 5 having a first opening in the first side wall forward of the first wheel well housing and a second opening in the second side wall forward of the second wheel well housing, and further comprising a compartment cover extending between and in abutting contact with respective inner panels of the first and second side walls to define a storage compartment within the cargo carrying space, the storage compartment communicating with the first and second openings respectively, whereby the interior of the storage compartment is accessible through both the first and the second openings.

7. A vehicle according to claim 5 having a first opening in the first side wall forward of the first wheel well housing and a second opening in the second side wall forward of the second wheel well housing, and further comprising:

a first compartment cover in abutting contact with the inner panel of the first side wall forward of the first wheel well housing and defining a first storage compartment inside of the cargo carrying space, the first storage compartment communicating with the first opening whereby the interior of the first storage compartment is accessible through the first opening; and a second compartment cover in abutting contact with the inner panel of the second side wall forward of the second wheel well housing and defining a second storage compartment inside of the cargo carrying space, the second storage compartment communicating with the second opening whereby the interior of the second storage compartment is accessible through the second opening.

8. A vehicle according to claim 7 wherein the first and second compartments extend no further toward the bed centerline from their respective side walls than the inwardmost extent of their respective wheel well housings.

9. A vehicle having a bed defining a cargo carrying space, the bed comprising:

a floor;

a front wall;

first and second spaced, substantially parallel side walls, each side wall comprising inner and outer spaced panels;

at least one opening passing through the inner and outer panels of at least one of the side walls;

frame means disposed within the opening adjacent the periphery thereof and extending between the inner and outer panels of the at least one side wall; and door means secured to the frame means and movable between a closed position and an open position.

10. A kit for modifying a vehicle having a bed defining a cargo carrying space, the bed having front and rear ends and a longitudinal centerline and comprising a floor and first and second spaced, parallel side walls, each side wall comprising inner and outer spaced panels, and having at least one opening passing through the inner and outer panels of at least one side wall, the kit comprising:

frame means for installation within and around the perimeter of the opening to extend between the inner and outer panels of the one side wall; and door means connectable to the frame means by hinge means for movement between a closed position and an open position.

11. A kit according to claim 10 wherein the frame means comprises:

a sleeve for insertion into the opening through the outer panel, the sleeve comprising a wall liner to extend substantially perpendicularly between the outer and inner panels and a flange projecting outwardly from the sleeve to extend into overlapping contact with the outer panel and be secured to the outer panel around the perimeter of the opening; and a clamp ring for insertion into the opening through the inner panel, the clamp ring comprising a bonding ring to extend into the opening and into contact with the wall liner and a second flange projecting outwardly from the bonding ring to extend into overlapping contact with the inner panel and be secured to the inner panel around the perimeter of the opening.

12. A kit according to claim 10 further including enclosure means for positioning in the cargo carrying space abuttingly adjacent the inner panel of the one side wall to form a storage compartment within the cargo carrying space and in communication with the opening.

13. A kit according to claim 12 for modifying a vehicle further comprising first and second wheel well housings projecting upwardly from the floor and inwardly toward the centerline from the first and second side walls respectively at a distance rearward from the front end, a first opening in the first side wall forward of the first wheel well housing, and a second opening in the second side wall forward of the second wheel well housing, and wherein the enclosure means comprises:

a compartment cover configured to extend between respective inner panels of the first and second side walls forward of the wheel well housings to define a storage compartment within the cargo carrying space and accessible through both the first and the second openings.

14. A kit according to claim 12 for modifying a vehicle further comprising first and second wheel well housings projecting upwardly from the floor and inwardly toward the centerline from the first and second side walls respectively at a distance rearward from the front end, a first opening in the first side wall forward of the first wheel well housing, and a second opening in the second side wall forward of the second wheel well housing, and wherein the enclosure means comprises:

a first compartment cover for positioning abuttingly adjacent the inner panel of the first side wall forward of the first wheel well housing to define a first storage compartment inside of the cargo carrying space and accessible through the first opening; and a second compartment cover for positioning abuttingly adjacent the inner panel of the second side wall forward of the second wheel well housing to define a second storage compartment inside of the cargo carrying space and accessible through the second opening.

15. A kit according to claim 14 wherein the first and second storage compartments are configured such that when installed in the bed they extend no further toward the bed centerline from their respective side walls than the inwardmost extent of their respective wheel well housings.

* * * * *